| United States Patent [19] | [11] 3,762,929 |
|---|---|
| DeLapp | [45] Oct. 2, 1973 |

[54] METHOD OF MAKING A SOY PROTEIN CONCENTRATE

[75] Inventor: Darwin Fiske DeLapp, New Canaan, Conn.

[73] Assignee: American Cyanamid Company, Stamford, Conn.

[22] Filed: Oct. 21, 1971

[21] Appl. No.: 191,471

[52] U.S. Cl. .................................. 99/17, 260/123.5
[51] Int. Cl. .............................................. A23j 3/00
[58] Field of Search .................... 99/17, 14, 98, 99, 99/129, 131; 260/123.5

[56] References Cited
UNITED STATES PATENTS
3,407,076  10/1968  Ganz ..................................... 99/139
2,881,076   4/1959  Sair ......................................... 99/14

Primary Examiner—A. Louis Monacell
Assistant Examiner—William Andrew Simons
Attorney—Frank M. Van Riet

[57] ABSTRACT

A method of making a soy protein concentrate wherein soy bean flakes are contacted with a polysaccharide selected from the group consisting of carboxymethyl cellulose, guar gum, sodium alginate, carrageenans, gum karaga, alginic acid and agar and excess water at a pH of 4.2-4.6 and recovering the resultant insoluble protein fraction.

2 Claims, No Drawings

METHOD OF MAKING A SOY PROTEIN CONCENTRATE

SUMMARY

The treatment of soy beans in order to extract various derivatives therefrom has long been practiced commercially. Although many procedures for recovering these derivatives have been devised, one of the continuing deficiencies has been the extremely bitter taste of commerical products. Efforts to relieve this bitter taste have been only partially successful and generally have resulted in the loss of a portion of valuable protein.

I have now found a unique method whereby soy concentrate is produced, said concentrate being substantially free of the bitter principles which are found commercially unacceptable. My novel process enables the prevention of the 15–20 percent loss of protein which is normally sent to waste by minimizing the protein dissolution.

DESCRIPTION OF THE INVENTION INCLUDING PREFERRED EMBODIMENTS

My novel process comprises contacting soy flake with water and a polysaccharide under various conditions of pH, temperature and time. The soy flake is contacted with an excess of water in the presence of from about 0.5 percent to about 4.0 percent, by weight, based on the weight of the soy bean flake, of a polysaccharide such as carboxymethyl cellulose, guar gum, carrageenan sodium alginate, gum karaya, alginic acid, and agar fractions thereof or materials containing substantial quantities thereof. Suitable polysaccharides are disclosed in U.S. Pat. Nos. 3,252,961; 3,404,142; 3,069,327 which patents are hereby incorporated herein by reference.

The polysaccharide apparently somehow chemically combines with the soy flake and substantially prevents and minimizes the dissolution of the protein in the water at the pH employed.

The extraction is conducted at a temperature ranging from about 20° C. to about 50° C. for from about 30 minutes to about 2 hours. A pH in the range of from about 4.2 to about 4.6 is employed by the use of a sufficient amount of any food grade acid such as hydrochloric acid, acetic acid and the like.

After treatment the resultant high protein containing concentrate is recovered. The concentrate generally comprises from about 65 to 70 percent protein, the remainder being carbohydrates and crude fiber. Recovery can be effected by filtration, centrifugation etc. the particular method involved forming no part of the instant invention.

The novel concentrate produced by the process of the instant invention can be utilized as a protein supplement in that from about 6–8 percent thereof used as an additive to food products increases their nutritional value.

The following examples are set forth for purposes of illustration only and are not to be construed as limitations on the present invention except as set forth in the appended claims. All parts and percentages are by weight unless otherwise specified.

EXAMPLE 1

To a suitable vessel are added 2,500 ml. of water containing 5 ml. of glacial acetic acid to give a pH of 4.4. 100 parts of ground defatted soy bean flake are added along with 2.0 parts of carrageenan. The resultant mixture is stirred for one hour at ambient temperature. The water is then centrifuged off and the insoluble fraction is dried. The resultant product is in excess of 65 percent protein as calculated from nitrogen and represents a commercially attractive protein supplement, i.e., concentrate.

EXAMPLES 2-5

The procedure of Example 1 is again followed except that an equivalent amount of (2) carboxymethyl cellulose, (3) guar gum, (4) sodium alginate and (5) gum karaya are substituted for the carrageenan. In each instance, a high protein containing concentrate is recovered.

EXAMPLE 6

Lean beef (6.25 lbs.) is preground through a 1 inch grinder plate and then through a ⅛ inch grinder plate, and lean pork trimmings (6.25 lbs.) are also preground through a 1 inch grinder plate. The ground meat, 12.5 lbs. of the soy protein concentrate produced in Example 1, sodium chloride (0.5 lb.), sodium nitrate (14.0 gm.), sodium nitrite (1.75 gm.), cane sugar (28.35 gm.) and ice (7.0 lbs.) are treated in a silent cutter for 3 minutes. A seasoning of dextrose (16 gm.), cardamom (12 gm.), black pepper (10 gm.) and red pepper (4 gm.) are added and mixing is continued until the temperature has risen to 60° F. The emulsion is stuffed into 27/32 inch frankfurter casings by means of a small commerical stuffing machine, and the resultant frankfurters are smoked to an internal temperature of 150° F. The resultant frankfurters are very juicy and succulent when cooked in boiling water for 9 minutes.

I claim:

1. A method which comprises contacting soy bean flake with from about 0.5% to about 4.0%, by weight, based on the weight of the flake, of a polysaccharide selected from the group consisting of carboxymethyl cellulose, guar gum, sodium alginate, carrageenans, gum karaya, alginic acid, and agar and excess water, at a pH ranging from about 4.2 to about 4.6, at a temperature of from about 20°C. to about 50°C. and for from about 30 minutes to about 2 hours and recovering the resultant insoluble fraction.

2. A method according to claim 1 wherein said polysaccharide is a carrageenan.

* * * * *